United States Patent [19]

Sato et al.

[11] 4,113,264
[45] Sep. 12, 1978

[54] PHONOGRAPH RECORD PLAYER

[75] Inventors: Toru Sato, Sagamihara; Shunji Tokumitsu, Tokyo; Masaaki Sakai, Kawasaki; Kazuhiko Kawasaki, Musashino; Kenichiro Kaimori, Zama; Mitsuo Osawa, Fujisawa, all of Japan

[73] Assignee: Sony Corporation, Tokyo, Japan

[21] Appl. No.: 798,313

[22] Filed: May 19, 1977

Related U.S. Application Data

[63] Continuation-in-part of Ser. No. 765,374, Feb. 2, 1977, abandoned.

[30] Foreign Application Priority Data

Feb. 3, 1976 [JP] Japan .................................. 51-9956

[51] Int. Cl.$^2$ ........................................... G11B 17/16
[52] U.S. Cl. .............................. 274/15 R; 274/10 R
[58] Field of Search ........................... 274/10 R, 15 R

[56] References Cited

U.S. PATENT DOCUMENTS

| | | | |
|---|---|---|---|
| 2,818,263 | 12/1957 | Dale | 274/15 R |
| 3,433,486 | 3/1969 | Kawaharazaki | 274/15 R |
| 3,822,889 | 7/1974 | Nakagawa | 274/10 R |
| 3,827,697 | 8/1974 | Miyoshi | 274/10 R |
| 4,004,816 | 1/1977 | Guha | 274/10 R |
| 4,039,194 | 8/1977 | Nakagawa | 274/10 R |

*Primary Examiner*—Richard E. Aegerter
*Assistant Examiner*—John W. Shepperd
*Attorney, Agent, or Firm*—Lewis H. Eslinger; Alvin Sinderbrand

[57] ABSTRACT

In a phonograph record player having a tone arm carrying a pickup with a stylus to track the groove of a phonograph record on a turntable during a play operation and being mounted for lead-in movement from an elevated rest position outside the turntable perimeter to a selected set-down position of the stylus on the record for commencement of a play operation and for return or lead-out movement back to the rest position on termination of a play operation, a control mechanism is provided with a single mode selecting member or slide which is manually movable to positions for selecting stop, manual and repeat modes of operation, respectively, of the record player. More particularly, the manual mode selecting position of the slide and positions of the latter for selecting repeat modes of operation providing progressively increasing numbers of repeated play operations are arranged in order in the direction away from the stop mode position of the slide, and for each play operation of the record player the mode selecting slide is displaced in a step-wise manner toward its stop mode position. Further, at an extreme position of the mode selecting slide remote from the stop mode position, successive play operations are obtained without corresponding step-wise displacements of the slide so that the play operations are repeated indefinitely.

15 Claims, 7 Drawing Figures

PHONOGRAPH RECORD PLAYER

RELATED APPLICATION

This application is a continuation-in-part of our co-pending U.S. Patent Application Ser. No. 765,374, filed Feb. 2,1977 now abandoned.

BACKGROUND OF THE INVENTION

1. Field of the Invention

This invention relates generally to phonograph record players, and more particularly is directed to an improved control mechanism for a phonograph record player which permits the user to manually initiate a play operation or to select a desired number of automatically repeated play operations.

1. Description of the Prior Art

An automatic phonograph record player is known in which, upon actuation of a start lever or the like, a tone arm is led-in or moved from a rest position outside the perimeter of a turntable to a selected set-down position on a phonograph record supported by the turntable for the commencement of a play operation and, upon completion of the play operation, that is, when the tone arm attains an inner position corresponding to the engagement of the pickup stylus in the usual final non-recorded groove portion of the phonograph record, the tone arm is automatically led-out or returned to its rest position and the operation of the record player is terminated. With the foregoing automatic record player, only a single play operation is obtained upon actuation of the start lever, that is, a plurality of successive play operations or repreated reproduction of a phonograph record cannot be automatically obtained.

A phonograph record player has also been provided with an auto-repeat function, and in which the record player repeatedly plays or reproduces the same phonograph record until the user actuates a stop or reject lever. However, such phonograph record player does not permit the user to preselect a desired number of repeated play operations.

Furthermore, a phonograph record player has been proposed, for example, as disclosed in detail in U.S. Pat. No. 3,827,697, in which the number of repeated play operations can be preset to a desired value. More particularly, in the last mentioned existing phonograph record player, an index wheel is manually set to a position corresponding to a desired number of repeated play operations and, thereafter, at the end of each play operation, a control mechanism effects the return or lead-out movement of the tone arm to its rest position followed automatically by a lead-in movement of the tone arm to the selected set-down position until, at the completion of the final play operation, the tone arm is locked or retained in its rest position. However, in the case of such record player, it is not possible to effect manual operation thereof, that is, to manually move the tone arm from its rest position to any desired set-down position on the record, for example, as when it is desired to reproduce only a portion of the sound recorded on the record. Furthermore, if it is desired to change the number of repeated play operations preset by manual positioning of the index wheel, the latter can be turned only in one direction which decreases the facility with which the record player can be selectively controlled.

OBJECTS AND SUMMARY OF THE INVENTION

Accordingly, it is an object of this invention to provide a phonograph record player which can be selectively operated manually or operated automatically to provide repeated play operations, and which avoids the above mentioned disadvantages of the previously proposed phonograph record players.

More particularly, it is an object of this invention to provide a phonograph record player in which manual operation or automatic repeated play operations can be selected by manipulation of a single mode selecting member.

Another object is to provide a phonograph record player, as aforesaid, in which, at the completion of a predetermined number of repeated play operations, an opportunity is afforded to the user to manually obtain an additional play operation.

Still another object of the invention is to provide a phonograph record player, as aforesaid, in which the selection of the mode of operation is facilitated, and particularly in which the selected number of repeated play operations may be increased or decreased at will during the operation of the record player.

A further object of this invention is to provide a phonograph record player, as aforesaid, in which a position of a mode selecting member for selecting a manual mode of operation is interposed between positions of such member for selecting stop and repeat modes of operation, respectively, so as to facilitate the selection of the desired mode of operation.

A still further object of the invention is to provide a phonograph record player, as aforesaid, in which a step-wise movement of the mode selecting member in the direction toward the stop mode position thereof is effected for each play operation, and in which the mode selecting member has a plurality of repeat mode selecting positions which, considered in the direction opposed to the direction of the step-wise movement of the mode selecting member, provide progressively increasing numbers of repeated play operations so that the step-wise movement of the mode selecting member effects a count-down of the previously selected number of repeated play operations.

It is still a further object of the invention to provide a phonograph record player, as aforesaid, in which the means for effecting the step-wise movement of the mode selecting member for each play operation of the record player is engaged with the mode selecting member for only a brief interval so that the mode selecting member is otherwise free to be manually displaced for changing the selected mode of operation.

In accordance with an aspect of this invention, in a phonograph record player having a turntable rotatable by a drive means, and a tone arm carrying a pickup with a stylus to track the groove of a phonograph record on the turntable during a play operation and being mounted for lead-in movement from an elevated rest position outside the turntable perimeter to a selected set-down position of the stylus on a record for commencement of a play operation and for return movement of the tone arm to its rest position upon the termination of a play operation; a control mechanism comprises trip means actuable at will and upon completion of each play operation to cause a period of operation of a gear means by the drive means, lever means driven by the gear means for urging the tone arm to automatically undergo a return or lead-out movement and then a lead-in movement during successive portions of each period of operation of the gear means, latch means engageable for preventing the lead-in movement of the tone arm under the urging of the lever means, a mode selecting member of slide manually movable to positions for selecting stop, manual and repeat modes of operation, respectively, of the record player, means causing operation of the drive means when the mode selecting member is away from the stop mode position, that is, in a position for selecting the manual or repeat modes of operation, means for disengaging the latch means in response to the disposition of the mode selecting member in each position thereof corresponding to a repeat mode of operation, and means for temporarily disengaging the latch means in a concluding portion of each period of operation of the gear means following the portion thereof corresponding to the automatic lead-in movement of the tone arm so that, when the mode selecting member is in the position thereof for selecting the manual mode of operation, the tone arm can be manually led-in from its rest position to a manually determined set-down position on the record.

In accordance with a feature of this invention, the position of the mode selecting member for selecting the manual mode of operation is interposed between positions thereof for selecting the stop and repeat modes of operation, respectively, and the control mechanism further includes means responsive to each operation of the gear means for effecting step-wise movement of the mode selecting member in the direction toward the stop mode position thereof.

It is another feature of this invention to provide the mode selecting member with a plurality of positions thereof for selecting repeat modes of operation and which, considered in the direction opposed to the direction of the step-wise movement of the mode selecting member, correspond to progressively increasing numbers of repeated play operations.

In a preferred embodiment of the invention, the means for effecting the step-wise movement of the mode selecting member includes ratchet teeth arranged along an edge of the latter extending parallel to the direction of movement thereof, pawl means normally spaced from the edge of the mode selecting member to permit manual movement of the latter to any selected one of the possible positions of the mode selecting member, and means responsive to the concluding portion of each period of operation of the gear means for imparting an operative stroke to the pawl means by which the latter acts against one of the ratchet teeth for effecting the step-wise movement. Further, the previously mentioned ratchet teeth are preferably disposed along the mode selecting member so as to be out of the range of the operative stroke of the pawl means in the position of the mode selecting member for selecting the stop mode and also in the one of the positions for selecting repeat modes which is furthest from the stop mode position so that, when the mode selecting member is in such position furthest from the stop mode position, step-wise movement of the mode selecting member is not obtained and the play operation is repeated indefinitely until such time as the mode selecting member is manually shifted to one of the other positions thereof.

The above, and other objects, features and advantages of the invention, will be apparent from the following detailed description of an illustrative embodiment thereof which is to be read in connection with the accompanying drawings.

DESCRIPTION OF A PREFERRED EMBODIMENT

Figure 1:
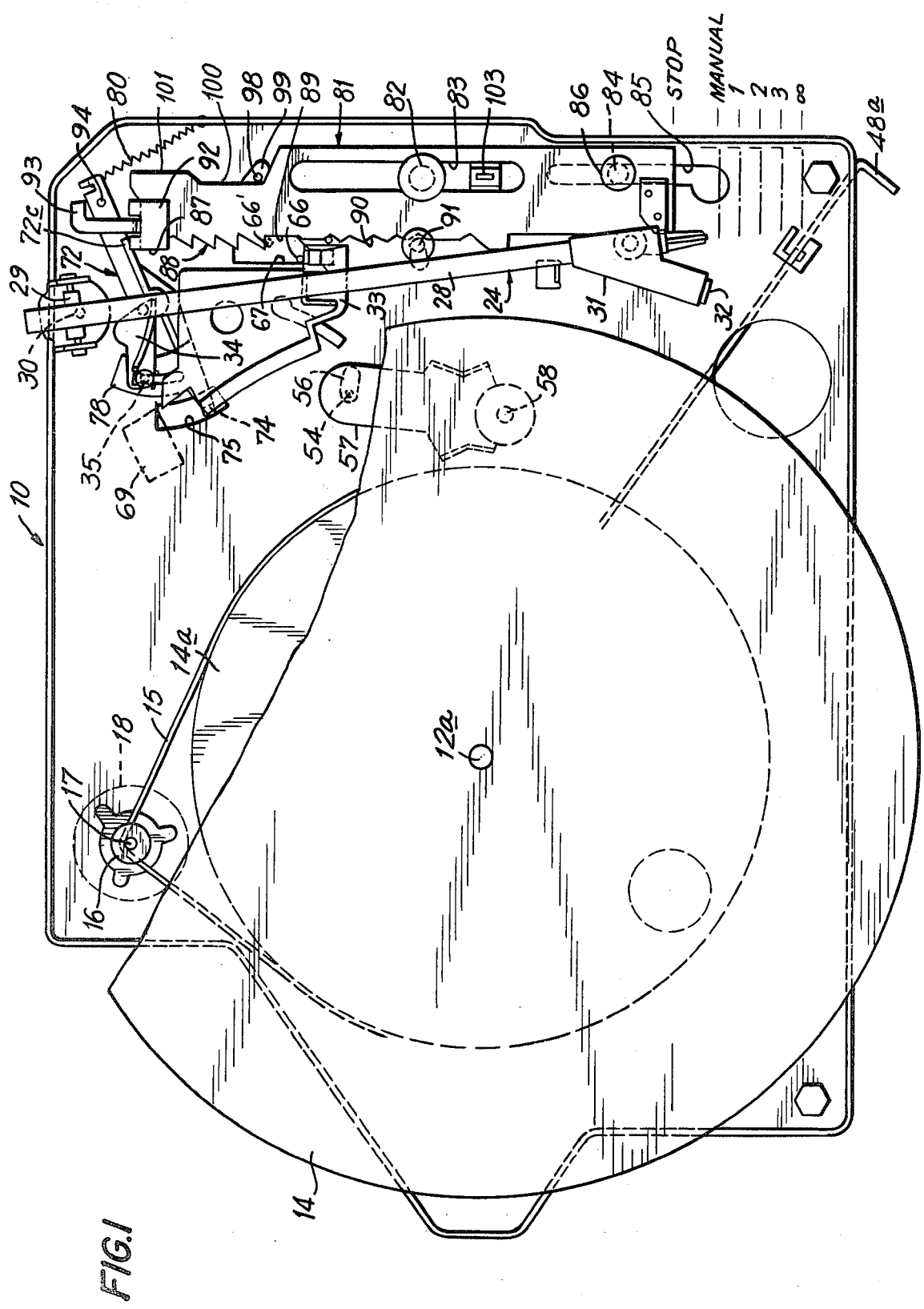
FIG. 1 is a top plane view of a phonograph record player according to an embodiment of this invention with a portion of the turntable thereof being broken away.
Figure 2:
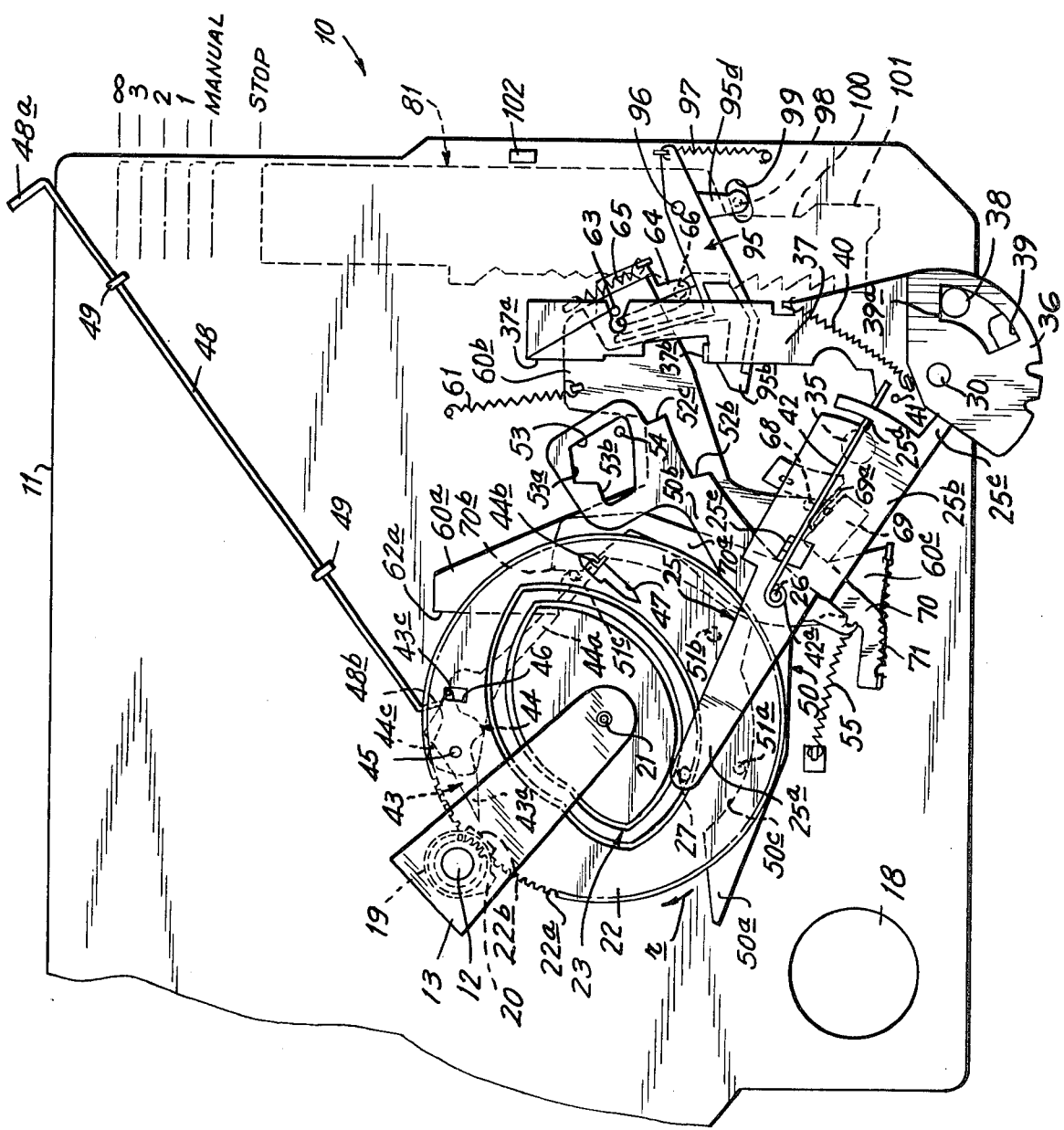
FIG. 2 is a bottom plan view of the phonograph record player which particularly shows the control mechanism thereof as viewed from below.
Figure 3:
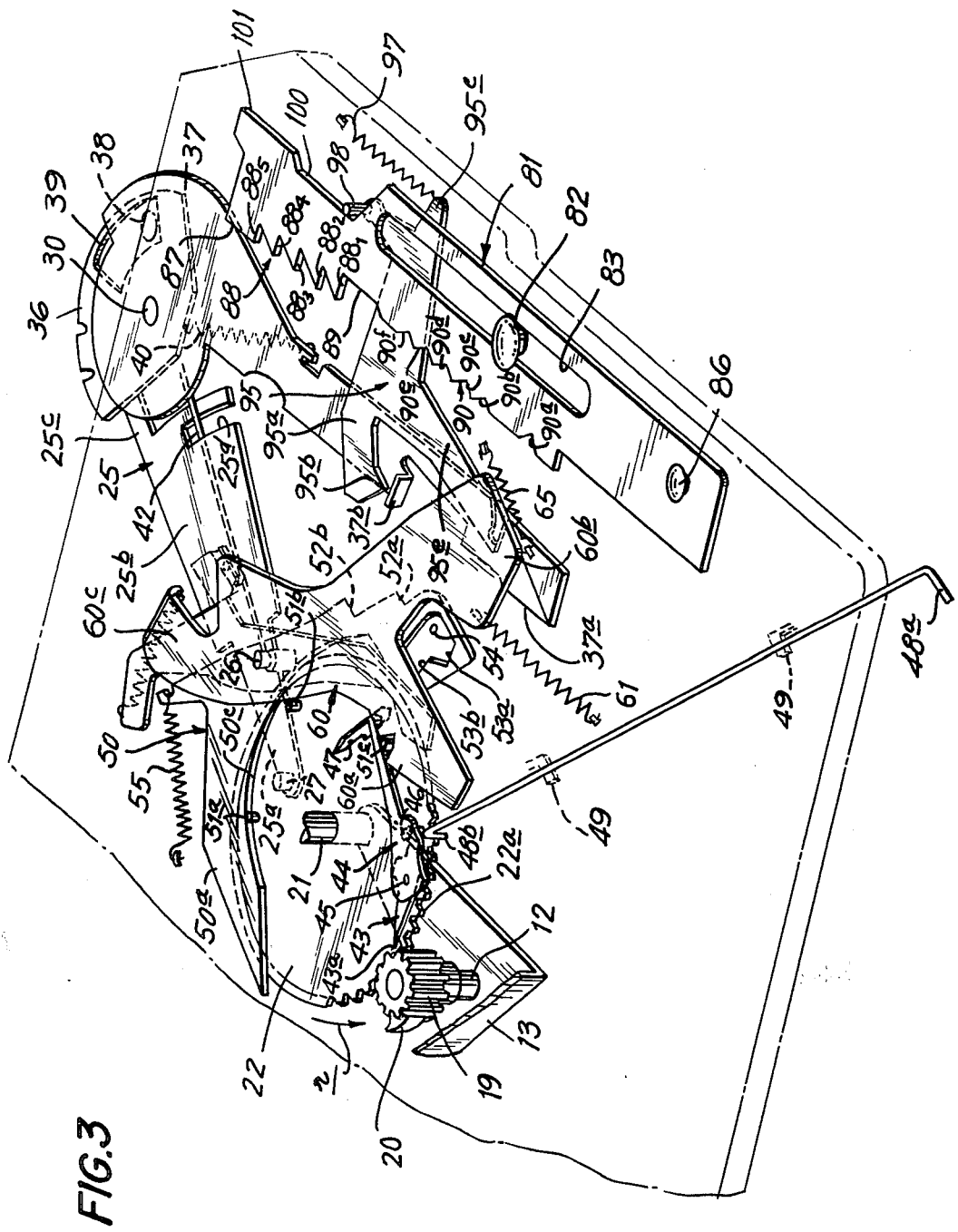
FIG. 3 is a perspective view showing several elements of the control mechanism of FIG. 2, but as viewed from above with the chassis being shown in broken lines for better illustrating the control mechanism.

Referring to the drawings in detail, and initially to FIGS. 1, 2 and 3, it will be seen that a phonograph record player 10 according to this invention generally comprises a chassis or frame plate 11 and a main shaft 12 (FIGS. 2 and 3) which extends through, and is journalled in suitable bearings (not shown) carried by chassis 11 and by a bracket 13 which is secured at the underside of the chassis. The upper end portion 12a of main shaft 12 is in the form of a spindle having a turntable 14 fixed thereon so as to be rotatable above chassis 11. A large-diameter pulley 14a (FIG. 1) is integral with turntable 14 at the underside of the latter, and a rubber belt 15 runs around pulley 14a and around a drive pulley 16 which is fixed on a shaft 17 of a motor 18 mounted below chassis 11 so that operation of motor 18 causes rotation of turntable 14 and of main shaft 12 therewith.

Figure 6:
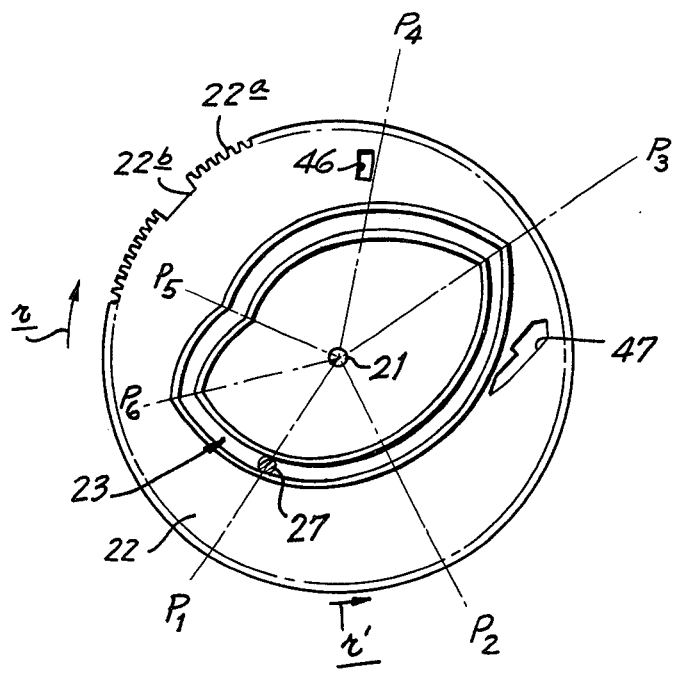
FIG. 6 is a detail bottom plan view of a control gear included in the mechanism shown on FIG. 2.
Figure 7:
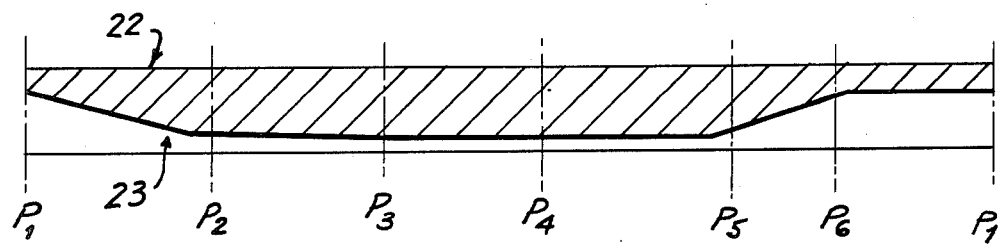
FIG. 7 is a diagrammatic view illustrating the variation on depth of a cam groove provided in the bottom of the control gear of FIG. 6.

Fixed on main shaft 12 or integral therewith between chassis 11 and bracket 13 is a pinion 19 which, at its upper portion, has a nose or abutment 20 projecting radially outward therefrom (FIGS. 2 and 3). An auxiliary shaft 21 spaced from main shaft 12 extends between the underside of chassis 11 and an end portion of bracket 13, and a relatively large-diameter control gear 22 is rotatably supported on such auxiliary shaft 21. Control gear 22 has peripheral teeth 22a for meshing engagement with pinion 19, and a gap 22b (FIG. 2) is provided in peripheral teeth 22a so that, in the stop position of control gear 22, gap 22b faces toward pinion 19, as shown on FIG. 2, for permitting rotation of pinion 19 with shaft 12 while control gear 22 remains at rest. The underside of control gear 22 is formed with a downwardly opening cam groove 23 (FIGS. 2 and 6). The radial distance from the axis of rotation of control gear 22, as defined by shaft 21, to groove 23 varies therealong for effecting lead-in and lead-out movements of a tone arm assembly 24 (FIG. 1), and the depth of cam groove 23, that is, the height of its upper surface, varies therealong, as shown on FIG. 7, for effecting the raising and lowering of tone arm assembly 24, as hereinafter described in detail.

A main lever 25 (FIG. 2) includes opposed arms 25a and 25b and is loosely mounted therebetween on a pivot pin 26 depending from chassis 11 so that lever 25 can swing horizontally about the axis of pivot pin 26 and also rock or tilt from the horizontal about pivot pin 26. A cam follower pin 27 extends upwardly from the free end of lever arm 25a and is engageable in cam groove 23 for following the radial and depth variations of the latter and thereby effecting horizontal swinging and tilting movements, respectively, of main lever 25 in response to turning of control gear 22.

As shown on FIG. 1, tone arm assembly 24 includes an elongated tone arm 28 mounted adjacent one end, as by a gimbal 29, on the upper end of a vertical shaft 30 which is rotatable in suitable bearings carried by chassis 11, and a head-shell 31 extending from the opposite or free end of tone arm 28 to accommodate a cartridge 32 from which a stylus or needle depends. By reason of the above mounting of tone arm assembly 24, tone arm 28 is capable of lateral swinging movement about the vertical axis of shaft 30 across turntable 14 and also is capable of being raised and lowered about the horizontal axis of gimbal 29 relative to turntable 14 between an elevated rest position outside the perimeter of the turntable where tone arm 28 may be disposed on a fixed arm rest 33, as shown on FIG. 1, and an inner position (not shown) which corresponds to the engagement of the stylus of pickup 32 in the usual final nonrecorded groove portion of a phonograph record on turntable 14.

An arcuate arm lifter 34 (FIGS. 1 and 5) extends under tone arm 28 in all positions of the latter and is mounted at the upper end of a vertically movable shaft 35 which is slidable in a suitable bearing (not shown) carried by chassis 11. As indicated in broken lines on FIG. 2, the lower end of shaft 35 rests on arm 25b of main lever 25 so that tilting of the latter by the engagement of cam follower pin 27 in cam groove 23 causes vertical movements of shaft 35 and of arm lifter 34 therewith for raising and lowering tone arm 28.

As shown particularly on FIG. 2, the lower end portion of tone arm support shaft 30 extends below chassis 11 and a sector-shaped plate 36 is secured to the lower end of shaft 30 so as to be rotatable therewith. An elongated tone arm operating arm 37 is rotatably mounted on shaft 30 between sector-shaped member 36 and the underside of chassis 11 so as to be capable of turning relative to member 36. A coupling pin 38 is adjustably turnable about an eccentric axis relative to operating arm 37 and depends from the latter so as to be slidably received in an arcuate slot 39 in sector-shaped member 36. A spring 40 is connected between operating arm 37 and sector-shaped member 36 for urging arm 37 in the counter-clockwise direction to the position relative to member 36 shown on FIG. 2 and in which coupling pin 38 engages against an end 39a of slot 39. It will be appreciated that such angular position of arm 37 relative to member 36 can be adjusted by turning coupling pin 38 about its eccentric axis.

A drive pin 41 depends from operating arm 37 at a location spaced radially from shaft 30 and disposed between an extension 25c of lever arm 25b and a projecting end portion of a wire spring 42 which is mounted on main lever 25. As shown, wire spring 42 has an end coil 42a mounted on pivot 26 and extends from the latter under lever arm 25b and then through an arcuate guide slot 25d formed in lever arm 25b adjacent the free end of the latter. A tab 25e struck downwardly from lever arm 25b engages wire spring 42 adjacent the end portion mounted on pivot 26 for urging the outer end portion of spring 42 toward the closed end of arcuate slot 25d with the result that wire spring 42 tends to turn with lever arm 25b in a position relative to the latter in which the projecting end portion of wire spring 42 is substantially spaced from extension 25c of lever arm 25b.

It will be apparent that, when main lever 25 is turned in the clockwise direction from the stop position shown on FIG. 2, the projecting end portion of wire spring 42 engages drive pin 41 on operating arm 37 for turning the latter in the counter-clockwise direction about shaft 30 while coupling pin 38 engages end 39a of slot 39 for effecting similar turning of sector-shaped member 36 and thereby causing a lead-in swinging movement of tone arm 28. When such turning of operating arm 37 is limited or prevented, as hereinafter described continued turning of main lever 25 in the clockwise direction, as viewed on FIG. 2, is accompanied, and made possible, by flexing of wire spring 42 relative to lever arm 25b. On the other hand, when main lever 25 is turned in the counter-clockwise direction, for example, at the end of a play operation, extension 25c of lever arm 25b acts against drive pin 41 for turning operating arm 37 in the clockwise direction about shaft 30, for example, back to the position shown on FIG. 2, and such turning of operating arm 37 is transmitted through spring 40 to sector-shaped member 36 for effecting the return or lead-out swinging movement of tone arm 28 back to its rest position shown on FIG. 1. In the event that the return or lead-out movement of tone arm 28 is manually or otherwise blocked, spring 40 is extended and coupling pin 38 moves along slot 39 away from end 39a to prevent damage to the control mechanism.

In order to inititate turning of control gear 22 from its stop position in which toothless gap 22b faces pinion 19, first and second trips 43 and 44 (FIGS. 2 and 3) are pivotally mounted one above the other on a pivot pin 45 extending upwardly from control gear 22 at a location adjacent the periphery of the latter which is spaced from toothless gap 22b in the direction of rotation of control gear 22 indicated by the arrow r on FIGS. 2, 3 and 6. The first trip 43 is shown to include an arm terminating in a pawl portion 43a extending in the direction toward toothless gap 22b and being radially inwardly disposed in respect to the latter in a inactive position of trip 43, as shown. The opposite end portion of trip 43 constitutes an actuating arm 43b terminating in a downwardly directed tab 43c which is received in an opening 46 in control gear 22 for limiting the pivotal movement of trip 43 between the illustrated inactive position and an active position in which pawl portion 43a moves radially outward over gap 22b. The second trip 44 is frictionally engageable with trip 43 and includes an elongated arm 44a extending substantially in a chordal direction over control gear 22 from pivot pin 45 and terminating in a depending extension 44b which is directed downwardly through a slot 47 in control gear 22. Trip 44 is further shown to have a cam portion 44c extending from pivot 45 in the direction generally opposed to arm 44a and being within the periphery of control gear 22 when trip 44 is in its active position shown on FIG. 1. However, when trip 44 is turned in the clockwise direction from the position shown on FIG. 2, as hereinafter described, cam portion 44c projects outwardly beyond the periphery of control gear 22 so as to be engageable by pinion 19 when moving past the latter for returning trip 44 to the illustrated inactive position thereof.

It will be apparent that, with main shaft 12 being rotatably driven, angular displacement of first trip 43 in the clockwise direction from the inactive position shown on FIG. 2 to its active position, in which pawl portion 43a projects above toothless gap 22b in the periphery of control gear 22, causes pawl portion 43a to be engageable by abutment 20 on pinion 19 for initiating the turning of control gear 22 in the clockwise direction and thereby bringing the peripheral teeth 22a into meshing engagement with pinion 19. As a result of such meshing engagement, control gear 22 is turned through a full revolution at the conclusion of which toothless gap 22b again confronts pinion 19.

A start-reject control rod 48 extends under chassis 11 and is turnable in brackets 49 depending from the chassis. An outer end of rod 48 extends adjacent the perimeter of chassis 11 and has a manually actuable portion or handle 48a thereon, while the opposite or inner end of rod 48 extends adjacent the actuating arm 43b of first trip 43 with control gear 22 in its stop position and has a bent end portion 48b. Upon manual turning of start-reject control rod 48 by means of handle 48a, bent end portion 48b of rod 48 acts against actuating arm 43b of trip 43 for pivotally moving the latter to its active position and thereby initiating rotation of control gear 22 as previously described. After tone arm 28 has been lead-in to a predetermined set-down position on a record carried by turntable 14 for initiation of a play operation of record player 10, as hereinafter described, tone arm 28 continues to swing progressively inward toward the center of the phonograph record in response to the tracking of the spiral record groove by the stylus of pickup 32 until, at the completion of the play operation, that is, when the stylus tracks the usual final non-recorded groove portion of the record, an end portion 37a of operating arm 37 acts against the depending extension 44b of second trip 44 for turning the latter in the clockwise direction from the inactive position shown on FIG. 2. Such clockwise turning of trip 44 is frictionally transmitted to trip 43 for again moving the latter to its active position and initiating another revolution of control gear 22. Thus, a complete revolution of control gear 22 from its stop position is initiated upon movement of trip 43 to its active position either in response to manipulation of start-reject control rod 48 or in response to actuation of trip 44 by end portion 37a of operating arm 37. In either case, by reason of the frictional coupling of trips 43 and 44, the movement of trip 43 to its active position is accompanied by a corresponding movement of trip 44 so that cam portion 44c of the latter projects outwardly beyond the periphery of control gear 22 with the result that, as control gear 22 nears the completion of a revolution thereof, cam portion 44c is engaged by pinion 19 for returning strips 43 and 44 to their inactive positions.

Referring in detail to FIG. 6, it will be seen that the radial distance from cam groove 23 to the axis of shaft 21 decreases slightly from the point $P_1$, at which groove 23 is engaged by follower pin 27 with control gear 22 in its stop position, to a point $P_2$ which is spaced along groove 23 in the direction $r'$ opposed to the direction $r$ of rotation of control gear 22. As shown on FIG. 7, along the length of groove 23 from point $P_1$ to point $P_2$, the depth of the cam groove decreases sharply from its maximum depth at point $P_1$. Therefore, if rotation of control gear 22 is initiated by the action of end portion 37a of operating arm 37 against trip 44 at the completion of a play operation, as described above, the engagement of cam groove 23, from point $P_1$ to point $P_2$, with cam follower pin 27 first moves extension 25c of main lever 25 away from drive pin 41 while lever 25 is tilted to raise shaft 35 and arm lifter 34 for lifting the pickup stylus from the record on turntable 14.

Along the length of cam groove 23 from point $P_2$ to point $P_3$ on FIG. 6, the radial distance from the cam groove to the axis of shaft 21 increases at a substantial rate while the cam groove has a minimum depth (FIG. 7) so that extension 25c of main lever 25 acts against drive pin 41 for effecting the lead-out movement or outward swinging of tone arm 28 to its rest position with the tone arm being raised during such outward swinging. Continuing along the length of cam groove 23 from point $P_3$ to point $P_4$ on FIG. 6, the radial distance to the cam groove decreases sharply for rapidly turning main lever 25 in the direction bringing the end portion of wire spring 42 against drive pin 41 and, thereafter, from point $P_4$ to point $P_5$ along cam groove 23, the radial distance to the latter decreases further, but at a reduced rate, so that the action of spring 42 on drive pin 41 causes lead-in movement or inward swinging of tone arm 28 to a set-down position which has been selected earlier, as hereinafter described. Along the length of cam groove 23 from point $P_3$ through point $P_4$ to $P_5$, the cam groove has its minimum depth (FIG. 7), so that tone arm 28 is raised during the leadin movement thereof. Along the length of cam groove 23 from point $P_5$ to point $P_6$, the depth of the cam groove increases sharply (FIG. 7) so that main lever 25 is tilted to lower shaft 35 and arm lifter 34 and thereby permit tone arm 28 to move downwardly for engaging the pickup stylus with a record at the selected set-down position on the latter. Further, from point $P_5$ to point $P_6$, the radial distance increases (FIG. 6) so that wire spring 42 is moved away from drive pin 41 at the moment when the pickup stylus is set down on the record, thereby ensuring that the pickup stylus can accurately track the record groove without resistance from the control mechanism. Finally, from point $P_6$ back to the starting point $P_1$, the depth of cam groove 23 remains maximum (FIG. 7) to ensure that arm lift 34 is disengaged from tone arm 28 during a play operation, and the radial distance to cam groove 23 decreases gradually (FIG. 6) to ensure that extension 25c will be out of the way of drive pin 41 as the latter moves with operating arm 37 during a play operation.

From the above, it will be seen that the configuration of cam groove 23 is selected so that, if a revolution of control gear 22 is initiated at the end of a play operation by the engagement of end portion 37a of operating arm 37 with trip 44, the control mechanism of record player 10 can effect a lead-out movement of tone arm 28 followed by a lead-in movement of the tone arm for initiating another play operation. On the other hand, if a revolution of control gear 22 is initiated with tone arm 28 in its rest position on arm rest 33, as by manipulation of start-reject control rod 48 for actuating trip 43, tone arm 28 remains at its rest position and is merely raised from arm rest 33 during the engagement of cam follower pin 27 by the portion of cam groove 23 from point $P_1$ to point $P_3$ and, thereafter, a lead-in movement of the tone arm is effected, as previously described, for commencement of a play operation.

In order to selectively determine the set-down position of tone arm 28 during a lead-in operation of record player 10, the latter is shown on FIG. 2 to include a set-down determining lever 50 which is pivotally mounted on pivot pin 26 in a plane above the upper surface of control gear 22, and which includes an arm 50a extending from pivot pin 26 generally in the direction of rotation of control gear 22 and an oppositely directed arm 50b. The arm 50a is formed with an arcuate inner edge 50c concentric with control gear 22 and being successively engageable by upstanding pins 51a, 51b and 51c spaced apart along a portion of control gear 22 for holding lever 50 against turning in the clockwise direction on FIG. 2 from its illustrated inoperative position. The arm 50b of lever 50 is shown to have an edge thereof formed with first and second steps 52b and 52c which are spaced apart along arm 50b and adapted to be selectively interposed in the path of movement of an upstanding lug 37b formed on operating arm 37 for selectively limiting the turning of arm 37 by wire spring 42 in the counter-clockwise direction, as viewed on FIG. 2, and thereby selectively determining the set-down position of the tone arm. The end portion of lever 50b has an opening 53 therein which has its perimeter formed with steps 53a and 53b selectively engageable with a pin 54 for correspondingly limiting the turning of lever 50 in the clockwise direction under the urging of a spring 55 to a first operative position or a second operative position, respectively, when control gear 22 is positioned to free all of its pins 51a, 51b and 51c from edge 50c of lever arm 50a. In such first and second operative positions of lever 50, the steps 52a and 52b of lever 50 are respectively engageable by lug 37b to establish the respective set-down positions of the tone arm. As shown on FIG. 1, pin 54 may depend through a slot 56 in chassis 11 from an arm 57 which is angularly displaceable about a pivot 58 so as to selectively dispose pin 54 for engagement by either step 53a or step 53b in opening 53 when spring 55 is effective to move lever 50 from its inoperative position. Arm 57 carrying pin 54 may be suitably angularly displaced, for example, by a manually actuable mechanism (not shown), so as to select either the first or second operative position of lever 50 and a corresponding set-down position of tone arm 28 in accordance with the diameter of the phonograph record disposed on turntable 14.

Figure 4:
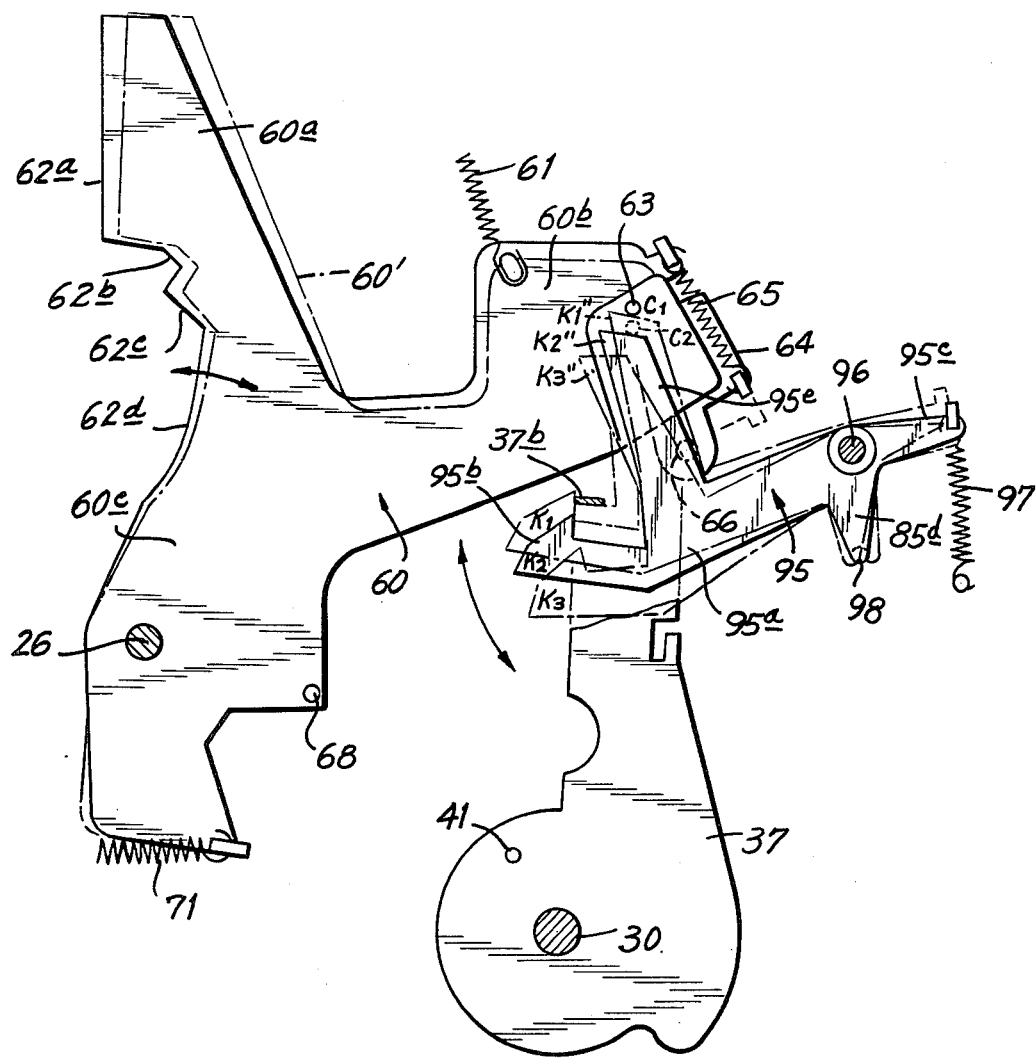
FIG. 4 is an enlarged top plan view of a portion of the control mechanism according to this invention.

The record player 10 according to this invention further includes a repeat feed lever 60 which, as particularly shown on FIG. 4, is of generally Y-shaped configuration so as to have arms 60a and 60b branching from a stem 60c which is pivoted on pivot pin 26 above the previously described lever 50 with the outer edge portion of arm 60a overlying the periphery of control gear 22. The pin 51c which is in a trailing position, considered in the direction of rotation of control gear 22, relative to the other two pins 51a and 51b projecting upwardly from control gear 22, is taller than the pins 51a and 51b so as to be engageable with the outer edge of arm 60a of repeat feed lever 60. A spring 61 is connected between arm 60b and an anchor on chassis 11 for urging lever 60 in the counter-clockwise direction about pivot pin 26, as viewed on FIGS. 2 and 4, and thereby engaging the outer edge of arm 60a with pin 51c as the latter moves therepast. As shown particularly on FIG. 4, the outer edge of arm 60a, starting from the free end thereof, is formed successively with a straight cam portion 62a, a V-shaped notch 62b, an oblique cam portion 62c and an arcuate cam portion 62d which has approximately the same radius of curvature as the circular path of travel of pin 51c on control gear 22. Notch 62b is located to receive pin 51c when control gear 22 is in its stop position (FIG. 2), with the result that the yieldable force of spring 61 on lever 60 serves to prevent inadvertent movement of control gear 22 from its stop position. A pin 63 is secured in the free end portion of arm 60b and extends above and below the latter. A pawl support member 64 is pivotally mounted on pin 63 above arm 60b and is urged relative to the latter in the counter-clockwise direction to the position shown on FIG. 4 by means of a spring 65. A pawl pin 66 projects upwardly from member 64 through an opening 67 (FIG. 1) in chassis 11. Further, a switch actuating pin 68 depends from stem 60c of repeat feed lever 60 and is engageable with the actuator of a normally open microswitch 69 for closing the latter and thereby supplying power to motor 18 for operating the latter.

As shown in broken lines on FIG. 2, micro-switch 69 is mounted on a switch support lever 70 which is pivoted on pivot pin 26 between set-down determining lever 50 and repeat feed lever 60 so that turning of lever 70 relative to lever 60 is effective to move micro-switch 69 toward and away from switch actuating pin 68. A spring 71 is connected between stem 60c of lever 60 and an adjacent end of switch support lever 70 for urging the latter in the counter-clockwise direction, as viewed on FIG. 2, relative to repeat feed lever 60 so that an actuator 69a of micro-switch 69 is moved against switch actuating pin 68 for closing of the micro-switch. An arm 70a of switch support lever 70 extends generally along arm 60a of repeat feed lever 60 and terminates in a lateral projection 70b located adjacent V-shaped notch 62b in the outer edge of arm 60a. Thus, when control gear 22 is in its stop position with pin 51c thereon engaging in V-shaped notch 62b, such pin 51c also acts against projection 70b of switch support lever 70 for turning the latter in the clockwise direction relative to repeat feed lever 60 against the force of spring 71, with the result that micro-switch 69 is moved away from switch actuating pin 68 which releases actuator 69a of the micro-switch to permit the latter to attain its normal open condition. From the foregoing, it will be apparent that, after a revolution of control gear 22 has been initiated, switch actuating pin 68 maintains micro-switch 69 in its closed position until control gear 22 is returned to its initial or stop position at the completion of such revolution.

Figure 5:
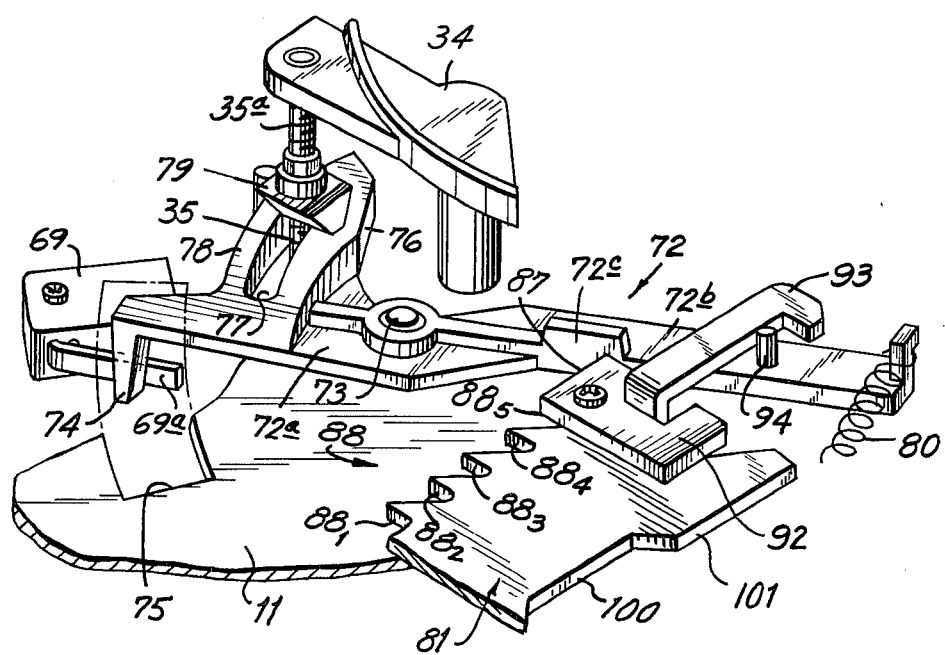
FIG. 5 is an enlarged perspective view of another portion of the control mechanism according to this invention.

Referring now to FIGS. 1 and 5, it will be seen that, in record player 10 according to this invention, arm lifter 34 and micro-switch 69 are further controllable by an auxiliary control lever 72 positioned above chassis 11 adjacent arm lifter 34 and being pivotally mounted, intermediate its ends, on a pivot pin 73 (FIG. 5) carried by chassis. Auxiliary control lever 72 is shown to include oppositely extending arms 72a and 72b, with the free end of arm 72a having a switch actuating lug 74 depending therefrom through an arcuate slot 75 in chassis 11 so as to be engageable with actuator 69a of microswitch 69 disposed below the chassis. Arm 72a of lever 72 is further shown to have a rearwardly directed extension 76 formed with an arcuate slot 77 through which shaft 35 extends for supporting arm lifter 34 thereabove. The top surface of extension 76 is inclined to define a cam surface 78 which is slidably engageable by a cam follower member 79 adjustably disposed on a threaded portion 35a of shaft 35. A spring 80 is connected between the free end of arm 72b and a suitable anchor on chassis 11 (FIG. 1) for urging auxiliary control lever 72 in the clockwise direction from its stop or inoperative position shown on FIGS. 1 and 5. It will be seen that, with auxiliary control lever 72 in such stop or inoperative position, switch actuating lug 74 is spaced from actuator 69a of micro-switch 69 so as to permit the latter to be in its open condition with control gear 22 at its stop position. Further, with lever 72 in its inoperative position, the relatively high end portion of cam surface 78 engages cam follower 79 so as to maintain arm lifter 34 in the raised position of the latter. Thus, with auxiliary control lever 72 in its stop or inoperative position and control gear 22 in its stop position, micro-switch 69 is open to render motor 18 inoperative, and arm lifter 34 is raised even though cam groove 23 then acts to tilt main lever 25 in the direction for lowering shaft 35, in which case the lower end of shaft 35 is separated from the underlying portion of lever arm 25b.

The record player 10 according to this invention is further shown to include a mode selecting slide member 81 (FIGS. 1, 3 and 5) mounted on chassis 11 adjacent opening 67 of the latter for rectilinear sliding movement relative to the chassis in the forward and rearward directions, for example, by means of a headed guide pin 82 mounted on chassis 11 and being slidably received in an elongated slot 83 in slide 81 and a guide pin 84 depending from the forward end portion of slide 81 and being slidably received in a guide slot 85 in chassis 11 (FIG. 1). The guide pin 84 may be integral with a knob 86 extending upwardly from slide 81 and by which the latter may be manually displaced to any selected one of a number of positions for determining the operating mode of record player 10, as hereinafter described in detail.

The inner longitudinal edge of slide 81, starting from the back end thereof, is formed successively with a straight edge portion 87, a series of raked or ratchet teeth 88 having their points or ends substantially aligned with straight edge portion 87 so as to be adapted to extend over opening 67 in chassis 11, a recess 89 substantially registering with the outer edge of opening 67, and a series of serrations or undulations 90 defining detents. A laterally movable detent ball 91 is mounted on chassis 11 (FIG. 1) and is urged by a spring (not shown) against the inner edge of slide 81 so as to be engageable in one of the serrations or undulations 90 of the slide for releasably retaining the latter in any selected position to which slide 81 has been manually set. A bearing block 92 is fixed on the back end of slide 81 so as to be engageable against an abutment 72c on arm 72b of auxiliary control lever 72 for displacing the latter to its stop or inoperative position when slide 81 is disposed in its rearmost position, as shown on FIGS. 1 and 5, for selecting the stop mode of record player 10.

In addition to the rearmost position of slide 81 for selecting the stop mode of record player 10, slide 81 is adapted to be selectively disposed in successive forwardly displaced positions for respectively selecting a manual mode of operation, repeat modes of operation in which the playing of a record on turntable 14 is repeated once, twice, and three times, respectively, and an indefinite repeat mode of operation in which the playing of the record is repeated indefinitely until such time as slide 81 is manually displaced to one of its other mode selecting positions.

Although spring 80 urges auxiliary control lever 72 to follow the movements of slide 81 when the latter is displaced forwardly from its rearmost position corresponding to the stop mode, a hook 93 extends rearwardly from slide 81 and is engageable with a pin 94 on arm 72b for ensuring that lever 72 will follow the movements of slide 81 in the event that the frictional resistance to movement of lever 72, for example, at the engagement of cam follower 79 with cam surface 78, may be sufficient to resist the turning of lever 72 by spring 80.

When control gear 22 is in its stop position so that pin 51c thereon engages in V-shaped notch 62b of repeat feed lever 60 (FIG. 2), lever 60 is positioned so as to dispose pawl pin 66 at a corner of opening 67 where pin 66 is outside the path of movement of ratchet teeth 88 on slide 81 so that the latter is free to be displaced either forward or rearwardly to any selected one of the positions thereof. Further, during the concluding portion of a revolution of control gear 22 from its stop position, pin 51c on the control gear moves along straight cam surface 62a of repeat feed lever 60 for substantially angularly displacing the latter in the clockwise direction about pivot pin 26, as viewed on FIG. 2. As a result of such angular displacement of lever 60, pawl pin 66 is moved diagonally across opening 67 in an operative stroke from the position indicated at 66 on FIG. 1 to the position indicated at 66'. If slide 81 is in its rearmost position for selecting the stop mode, such operative stroke of pawl pin 66 occurs within recess 89 of mode selecting slide 81 and, therefore, does not effect any movement of the mode selecting slide. However, if the operative stroke of pawl pin 66 occurs at a time when slide 81 is positioned to select either the manual mode of operation or any of the repeat modes of operation for repeating the playing operation one, two or three times, respectively, each operative stroke of pawl pin 66 will cause the latter to act against one of the ratchet teeth 88 of slide 81 for displacing the latter rearwardly by a distance equal to the pitch between successive ratchet teeth 88. Finally, if slide 81 is displaced to its most forward position for selecting the indefinite repeat mode, the straight edge portion 87 of slide 81 extends along opening 67 and, in response to the angular displacement of repeat feed lever 60 resulting from the movement of pin 51c along straight cam portion 62a, pin 66 merely rides along straight edge portion 87 of slide 81 without displacing the latter while pawl support member 64 is pivoted relative to lever 60 against the force of spring 65.

In the illustrated embodiment of the invention, the distance between the detent 90a corresponding to the stop mode position of slide 81 and the next detent 90b corresponding to the manual mode position is twice the uniform distance between the detents 90b, 90c, 90d, 90e and 90f, which uniform distances are each equal to the pitch of ratchet teeth 88. It will be understood that the detents 90c, 90d, 90e and 90f respectively correspond to the one repeat mode position, two repeat mode position, three repeat mode position and indefinite repeat mode position of slide 81. Further, it will be seen that the ratchet teeth 88 define active surfaces $88_1$, $88_2$, $88_3$, $88_4$ and $88_5$ extending at right angles to the direction of movement of slide 81, with the active surface $88_1$ being just out of the range of the operative stroke of pawl pin 66 when slide 81 is in its stop mode position.

As shown particularly on FIGS. 2, 3 and 4, the record player 10 according to this invention further includes a latch lever 95 pivotally mounted intermediate its ends on a pivot pin 96 depending from chassis 11 under slide 81 and having an inwardly directed arm 95a terminating in a latching nose or hook 95b that is engageable with lug 37b on operating arm 37 for locking the latter in the position thereof corresponding to the rest position of tone arm 28. The oppositely directed or outer arm 95c of latch lever 95 is acted upon by a spring 97 anchored to chassis 11 for urging latch lever 95 in the clockwise direction as viewed on FIGS. 2 and 4, that is, in the direction for engaging latching hook or mose 95b with lug 37b. Latch lever 95 is further shown to include a rearwardly directed arm 95d which, at its fee end, carries an upstanding pin 98 extending through a slot 99 in chassis 11 so as to be engageable against the outer longitudinal edge of slide 81. Latch lever 95 is further shown to have a forwardly directed extension 95e of its arm 95a, and such extension 95e has an oblique end edge extending across the path of movement of the lower end of pin 63 on repeat feed lever 60 (FIG. 4).

As shown particularly on FIGS. 1 and 3, the outer edge of slide 81 has a recess 100 disposed therealong to receive pin 98 when slide 81 is in its rearmost or stop mode position and also when slide 81 is in its next forward or manual mode position. So long as pin 98 is accommodated in recess 100 of slide 81, spring 97 is free to turn latch lever 95 in the clockwise direction, as viewed on FIG. 4, for disposing its latching nose 95b at the position $K_1$ where it is engageable with lug 37b on operating arm 37. However, when slide 81 is displaced forwardly to any of its one, two, three or indefinite repeat mode positions, pin 98 is engaged by an outer edge portion 101 of slide 81 to the rear of recess 100, and such edge portion 101 displaces pin 98 in the outward direction so as to turn latch lever 95 in the counterclockwise direction, as viewed on FIG. 4, for example, to the position indicated at $K_3$, in which latching nose 95b is held away from lug 37b on operating arm 37 so as to avoid any interference with the movements of the latter.

The record player 10 according to this invention may further include a speed change-over switch indicated schematically at 102 on FIG. 2, and a manually operable actuator for switch 102 which extends upwardly through slot 83 of slide 81 (FIG. 1) so that actuator 103 can be manually disposed for causing switch 102 to provide the desired operating speed of motor 18 for playing of a record disposed on turntable 14.

The above described record player 10 according to this invention operates as follows:

Starting with control gear 22 in its stop position shown on FIG. 2 and with mode selecting slide 81 in its rearmost or stop mode position, neither pin 68 on repeat feed lever 60 nor lug 74 on auxiliary control lever 72 engages acutator 69a of micro-switch 69 so that the latter is in its open condition and motor 18 is inoperative. Upon placing a phonograph record on turntable 14, arm 57 carrying pin 54 is angularly displaced to the position thereof corresponding to the desired set-down position of tone arm 28 on such phonograph record, and actuator 103 for speed change-over switch 102 is positioned to provide the requisite speed of rotation of turntable 14 for the phonograph record thereon.

Manual Mode of Operation

Upon forward displacement of slide 81 to its manual mode position, auxiliary control lever 72 is angularly displaced by spring 80 and by the engagement of hook 93 with pin 94 so as to move actuating lug 74 against actuator 69a of switch 69 for closing the latter and thereby initiating operation of motor 18. Thus, main shaft 12, turntable 14 and pinion 19 are rotated at the selected speed, but control gear 22 remains at rest with its toothless gap 22b confronting pinion 19. Upon manual actuation of start-reject control rod 48, trip 43 is moved to its active position by end portion 48b or rod 48 so as to initiate a revolution of control gear 22. As soon as control gear 22 has moved from its stop position, pin 51c thereon releases projection 70b on lever 70 so that spring 71 can turn lever 70 relative to repeat feed lever 60 so as to engage pin 68 on the latter with actuator 69a of micro-switch 69 for maintaining the latter in its closed condition until control gear 22 completes a full revolution, that is, is returned to its stop position. Since slide 81 is disposed in its manual mode position, pin 98 on latch lever 95 is received in recess 100 of slide 81 and spring 97 can dispose latch lever 95 in the position indicated at $K_1$ on FIG. 4 at which latching nose 95b engages lub 37b for locking operating arm 37 in its original position shown on FIG. 2 and which corresponds to the rest position of tone arm 28. During that portion of the revolution of control gear 22 in which cam follower pin 27 on main lever 25 is engaged by the portion of cam groove 23 from point $P_3$ to point $P_5$ (FIG. 6) that would normally cause lead-in movement of the tone arm, pin 51c is away from repeat feed lever 60 to permit spring 61 to urge the latter to the position shown in solid lines on FIG. 4 so that latch lever 95 locks operating arm 37 to prevent the lead-in movement, and spring 42 on main lever 25 merely flexes to accommodate the swinging of main lever 25 while operating arm 37 is locked by latch lever 95.

As control gear 22 nears the end of its revolution, pin 51c thereon rides against cam surface 62a on repeat feed lever 60 so as to angularly displace the latter in the clockwise direction, as viewed on FIGS. 2 and 4, with the result that an operating stroke is imparted to pawl pin 66. In such operating stroke of pawl pin 66, the latter acts against active surface $88_2$ of ratchet teeth 88 for displacing slide 81 rearwardly to a position midway between its manual mode position and stop mode position so that lug 74 on auxiliary control lever 72 continues to act against actuator 69a of micros-switch 69 for maintaining the latter in its closed condition. Accordingly, upon completion of the revolution of control gear 22, that is, the return of the latter to its stop position at which pin 51c again engages in V-shaped notch 62b of lever 60, the engagement of such pin 51c against projection 70b of switch support lever 70 for moving switch 69 away from pin 68 does not halt the operation of motor 18, as switch 69 continues in its closed condition by the action of the lug 74 on lever 72 against switch actuator 69a.

Further, upon the completion of the revolution of control gear 22, the engagement of pin 51c in V-shaped notch 62b of lever 60 holds the latter against the force of spring 61 at an intermediate position shown in broken lines at 60' on FIG. 4 and at which the lower end portion of pin 63 on arm 60b moves against the oblique end edge of extension 95e of latch lever 95 and displaces extension 95e to the position indicated at $K''_2$ (FIG. 4), whereby latching nose 95b is moved to the position indicated at $K_2$ for releasing lug 37b on operating arm 37. Upon such release of latching nose 95b from lug 37b, the tone arm 28 can be manually removed from ar rest 33 and set down on the phonograph record at any desired position on the latter for manually initiating a play operation.

Upon the completion of the playing of the record, the end portion 37a of operating arm 37 acts on trip 44 so as to move trip 43 to its active position for again initiating a revolution of control gear 22, as previously descrbed. During the revolution of control gear 22 following a play operation, the engagement with cam follower pin 27 of cam groove 23 from point $P_1$ to point $P_3$ (FIG. 6) effects swinging and tilting movements of main lever 25 by which tone arm 28 is raised from the record and led out to its rest position on arm rest 33. Since pin 98 on latch lever 95 is still accommodated in recess 100 of slide 81, upon the completion of the lead-out movement of tone arm 28, during which pin 51c moves along cam surface 62d to dispose lever 60 in the position shown in full lines on FIG. 4, nose 95b of latch lever 95 again engages lug 37b of operating arm 37 for locking the latter in the position corresponding to the rest position of the tone arm. Therefore, during the continued turning of control gear 22 in the revolution following a play operation, the engagement with cam follower pin 27 of the portion of cam groove 23 extending from point $P_3$ to point $P_5$ (FIG. 6) cannot effect lead-in movement of the tone arm and the latter remains in its rest position. As control gear 22 nears the completion of its revolution following a play operation, pin 51c again acts against cam surface 62a of repeat feed lever 60 for angularly displacing the latter so that pawl pin 66 engages in an operative stroke against active surface $88_1$ of ratchet teeth 88 with the result that slide 81 is displaced rearwardly to its stop position. Upon such movement of slide 81 to its stop position, bearing block 92 thereon acts against lug 72c of auxiliary control lever 72 for displacing the latter to its stop or inoperative position in which switch actuating lug 74 is separated from actuator 69a of micro-switch 69. However, due to the engagement of pin 68 on repeat feed lever 60 with actuator 69a a micro-switch 69, the latter remains in its closed condition for continuing the operation of motor 18 until control gear 22 has been returned to its stop position. When control gear 22 returns to its stop position, pin 51c engages projection 70b of lever 70 for turning the latter relative to repeat feed lever 60 so as to move micro-switch 69 away from pin 68 and cause opening of the micro-switch. With such opening of micro-switch 69 and the consequent halting of the operation of motor 18, record player 10 is returned to its stop mode or condition at the completion of an operation of the record player in its manual mode.

Predetermined Repeat Modes of Operation

In order to obtain a predetermined repeat mode of operation of record player 10, slide 81 is manually displaced to a selected one of its predetermined repeat mode positions, for example, to the two repeat mode position in which detent ball 91 engages detent 90d of slide 81, with the result that auxiliary control lever 72 is again displaced by spring 80 and hook 93 for causing lug 74 to close micro-switch 69 and provide for operation of motor 18. Then, start-reject rod 48 is manipulated to cause trip 43 to initiate a revolution of control gear 22. During the initial portion of such revolution of control gear 22, for example, during the engagement of cam groove 23 from point $P_1$ to point $P_3$ (FIG. 6) with cam follower pin 27, tone arm 28 remains in its rest position and is merely raised from arm rest 33. However, with slide 81 in a repeat mode position thereof, pin 98 on latch lever 95 engages edge portion 101 of slide 81 so that latch lever 95 is rocked to the position indicated at $K_3$ on FIG. 4 where its latch nose 95b releases lug 37b on operating arm 37. Accordingly, during the continued rotation of control gear 22 so as to engage the portion of cam groove 23 from point $P_3$ to point $P_5$ (FIG. 6) with cam follower pin 27 on main lever 25, operating arm 37 is free to be angularly displaced by the action of wire spring 42 on drive pin 41 for effecting the lead-in movement of tone arm 28. During the turning of cam groove 22 through the angular extent for effecting lead-in movement of tone arm 28, all of pins 51a, 51b and 51c on control gear 22 are free of arcuate edge 50c of set-down determining lever 50. Thus, spring 55 turns lever 50 in the clockwise direction, as viewed on FIG. 2, to the extent permitted by the engagement of pin 54 with step 53a or step 53b for interposing either step 52a or step 52b in the path of inward movement of lug 37b on operating arm 37. Accordingly, the set-down position of the led in tone arm 28 on the record is determined in correspondence with the preselected position of arm 57, and the playing of the record commences at such set-down position. As control gear 22 continues to turn, pin 51c rides against cam surface 62a on repeat feed lever 60 so as to angularly displace the latter for effecting an operating stroke of pawl pin 66. During such operating stroke of pawl pin 66, the latter acts against active surface $88_4$ on slide 81 for displacing the latter rearwardly through a distance equal to the pitch of ratchet teeth 88, that is, to the one repeat mode position in which detent ball 91 engages detent 90c. At the completion of the revolution of control gear 22, pin 51c thereon engages in V-shaped notch 62b of lever 60 for holding control gear 22 against inadvertent movement from its stop position. Although pin 51c when engaged in notch 62b, also acts against projection 70b of switch support lever 70 for moving micro-switch 69 away from pin 68, micro-switch 69 remains in its closed condition for continuing the operation of motor 18 by reason of the fact that lug 74 of auxiliary control lever 72 continues to act against actuator 69a of the micro-switch.

At the completion of the first play operation, end portion 37a of operating arm 37 acts on trip 44 for causing trip 43 to initiate another revolution of control gear 22. During such revolution of control gear 22, cam groove 23 cooperates with cam follower pin 27 of main lever 25 to effect lead-out movement of tone arm 28 to its rest position, and then to effect another lead-in movement of the tone arm to the selected set-down position on the record, as previously described, for commencing the second play operation. It will be noted that the lead-in movement of tone arm 28 for commencing the second play operation is made possible by the fact that, at the time of such movement, edge portion 101 of slide 81 still engages pin 98 on latch lever 95 for maintaining the latter in its inoperative or released position so that the latch nose 95b does not interfere with the angular displacement of operating arm 37 for effecting the lead-in movement.

In the course of the continued turning of control gear 22 following the lead-in movement of tone arm 28 for commencing the second play operation, pin 51c again acts against cam surface 62a on repeat feed lever 60 to effect an operative stroke of pawl pin 66 against active surface $88_3$ of slide 81 for displacing the latter rearwardly to its manual mode position in which, as previously described, detent ball 91 engages detent 90b and pin 98 on latch lever 95 is accommodated in recess 100. Upon return of control gear 22 to its stop position, pin 51c again engages notch 62b of lever 60 and projection 70b of lever 70, but the operation of motor 18 is continued by the action of lug 74 of auxiliary control lever 72 against actuator 69a of micro-switch 69 with slide 81 in its manual mode position.

At the completion of the second play operation, trip 44 is again actuated by end portion 37a of operating arm 37 for causing trip 43 to initiate another revolution of control gear 22 during which tone arm 28 is led-out to its rest position in response to the corresponding movement of operating arm 37, whereupon, lug 37b is engaged by latch nose 95b on latch lever 95 for preventing the subsequent automatic lead-in movement of tone arm 28 during the continued turning of control gear 22. However, as previously described in connection with the manual mode of operation, when control gear 22 completes its revolution, pin 51c thereon acts against V-shaped notch 62b of repeat feed lever 60 for angularly displacing the latter so that pin 63 thereon acts against the oblique end edge of extension 95e of latch lever 95 for rocking the latter to the position indicated at $K_2$ on FIG. 4. As a result of the foregoing, latch nose 95b is temporarily released from lug 97b for permitting tone arm 28 to be manually led in for commencing still another play operation following the automatically obtained first and second play operations. Further, the angular displacement of repeat feed lever 60 resulting from the action of pin 51c against cam surface 62a near the end of the revolution of control gear 22 produces an operating stroke of pawl pin 66 against active surface $88_2$ of slide 81 for further moving the latter to a position midway between its manual mode position and stop position.

If tone arm 28 has been manually led-in to commence an additional play operation following the automatically obtained first and second play operations, then, at the completion of such additional play operation, end portion 37a of operating arm 37 again actuates trip 44 for initiating still another revolution of control gear 22. During such revolution of control gear 22, tone arm 28 is again led out to its rest position and, at the completion of the corresponding movement of operating arm 37, latch nose 95b engages lug 37b for preventing another lead-in movement of tone arm 28. As control gear 22 nears the end of its revolution, the angular displacement of repeat feed lever 60 by the action of pin 51c against cam surface 62a produces an operating stroke of pawl pin 66 against active surface $88_1$ of slide 81 for displacing the latter to its stop position. Movement of slide 81 to its stop position causes lever 72 to disengage its lug 74 from actuator 69a of miro-switch 69. Therefore, when control gear 22 finally returns to its stop position, the engagement of pin 51c against projection 70b of switch support lever 70 for moving micro-switch 69 away from pin 68 is effective to cause opening of micro-switch 69 and a halt in the operation of motor 18.

If the user does not wish to manually obtain the above described additional play operation following the completion of the second automatically obtained play operation, at which time tone arm 28 has been led-out to its rest position and locked thereat while slide 81 has been displaced to its position intermediate the manual mode position and stop position, as described above, then the user merely manipulates start-reject rod 48 for initiating a further revolution of control gear 22. During such further revolution of control gear 22, tone arm 28 remains locked against the automatic lead-in movement thereof and repeat feed lever 60 displaces slide 81 to its stop position for halting operation of motor 18 upon the final return of control gear 22 to its stop position.

Although a predetermined repeat mode operation of record player 10 has been described above for the case where mode selecting slide 81 is initially manually displaced to its two repeat mode position for automatically obtaining two play operations in succession followed, if desired, by an additional manually initiated play operation, it will be apparent that record player 10 according to this invention operates similarly to automatically obtain either one play operation or three play operations followed, if desired by an additional manually initiated play operation, when slide 81 is disposed in its one repeat mode position or three repeat mode position, respectively. In each instance, that is, when either the one repeat mode, two repeat mode or three repeat mode of operation has been selected, slide 81 is displaced in a step-by-step manner by repeat feed lever 60 for counting-down the selected number of play operations as they occur. Since pawl pin 66 is engageable with an active surface of ratchet teeth 88 on slide 81 for effecting such step-by-step movement of the latter only during the operative stroke of pin 66 in response to engagement of pin 51c on control gear 22 with cam surface 62a of repeat feed lever 60, and pin 66 is otherwise clear of ratchet teeth 88, it will be apparent that slide 81 can at all other times be manually displaced in either direction for changing, at will, the position of slide 81 and the mode of operation of the record player.

Indefinite Repeat Mode of Operation

If slide 81 is displaced to its indefinite repeat mode position in which detent ball 91 engages detent 90f, straight edge portion 87 of slide 81 extends along opening 67, as previously described. The indefinite repeat mode of operation is again started by manipulation of start-reject rod 48 for moving trip 43 to its active position and thereby initiating a revolution of control gear 22. During such revolution of control gear 22, tone arm 28 is automatically led-in to the predetermined set-down position on the record, as previously described, for commencing a first play operation. At the completion of such first play operation, and at the completion of each succeeding play operation thereafter, trip 44 is actuated to cause trip 43 to initiate another revolution of control gear 22 during which tone arm 28 is led out to its rest position and then led in again to the predetermined set-down position for commencing another play operation. However, in the case of the indefinite repeat mode of operation, during each such revolution of control gear 22, the resulting angular displacement of repeat feed lever 60 and the corresponding operating stroke of pawl pin 66 does no effect movement of slide 81 from its indefinite repeat mode position, as pin 66 merely rides along straight edge portion 88 of slide 81. Accordingly, the play operation of record player 10 is repeated indefinitely until such time as slide 81 is manually displaced to another of its mode selecting positions.

It will be apparent that, in record player 10 according to this invention, a single member, that is, the slide 81, is manually displaceable for selecting either the manual mode of operation or any one of the repeat modes of operation so that the control of the record player is substantially simplified. Furthermore, since the position of slide 81 for selecting the manual mode of operation is between the stop position of slide 81 and the positions thereof for selecting successively increasing numbers of play operations, the logical selection of the desired mode of operation is facilitated.

Although an illustrative embodiment of the invention has been described in detail herein with reference to the accompanying drawings, it is to be understood that the invention is not limited to that precise embodiment, and that various changes and modifications may be effected therein by one skilled in the art without departing from the scope or spirit of the invention as defined in the appended claims.

What is claimed is:

1. In a phonograph record player having a rotatable turntable for supporting a phonograph record during the playing thereof, drive means for rotating said turntable, and a tone arm assembly including a tone arm carrying a pickup with a stylus to track the groove of a phonograph record on said turntable during a play operation and being mounted for lead-in movement of said tone arm from an elevated rest position outside the perimeter of said turntable to a selected set-down position of the stylus on a record supported by said turntable for commencement of a play operation and for return movement of said tone arm to said rest position upon the termination of a play operation: a control mechanism comprising gear means selectively driven by said drive means;
trip means actuable at will and upon completion of each play operation to cause a period of driving of said gear means by said drive means;
lever means driven by said gear means for urging said tone arm to automatically undergo said return movement and then said lead-in movement during respective portions of each period of driving of said gear means;
a mode selecting member manually movable to positions for selecting stop, manual and repeat modes of operation, respectively, of the record player;
latch means which is normally engaged with said mode selecting member in said position thereof for selecting said manual mode of operation, said latch means being operative when engaged to prevent said lead-in movement of the tone arm under the urging of said lever means;
means for causing operation of said drive means when said mode selecting member is in any one of said positions thereof for selecting the manual and repeat modes of operation, respectively;
means for disengaging said latch means in response to the disposition of said mode selecting member in each said position thereof for selecting a repeat mode of operation; and
means responsive to driving of said gear means for temporarily disengaging said latch means in a concluding portion of each period of driving of the gear means following said portion thereof corresponding to the automatic lead-in movement of the tone arm so that, with said mode selecting member in the position thereof for selecting the manual mode of operation, said tone arm can then be manually lead-in from said rest position to a manually determined set-down position on the record.

2. In a phonograph record player having a rotatable turntable for supporting a phonograph record during the playing thereof, drive means for rotating said turntable, and a tone arm assembly including a tone arm carrying a pickup with a stylus to track the groove of a phonograph record on said turntable during a play operation and being mounted for lead-in movement of said tone arm from an elevated rest position outside the perimeter of said turntable to a selected set-down position of the stylus on a record supported by said turntable for commencement of a play operation and for return movement of said tone arm to said rest position upon the termination of a play operation: a control mechanism comprising gear means selectively driven by said drive means;
trip means actuable at will and upon completion of each play operation to cause a period of driving of said gear means by said drive means;
lever means driven by said gear means for urging said tone arm to automatically undergo said return movement and then said lead-in movement during respective portions of each said period of driving of said gear means;
latch means for preventing said lead-in movement of the tone arm under the urging of said lever means;
a mode selecting member manually movable to positions for selecting stop, manual and repeat modes of operation, respectively, of the record player, said position of the mode selecting member for selecting the manual mode of operation being interposed between said positions for selecting the stop and repeat modes of operation, respectively;
means for causing operation of said drive means when said mode selecting member is in any one of said positions thereof for selecting the manual and repeat modes of operation, respectively;
means for disengaging said latch means in response to the disposition of said mode selecting member in each said position thereof for selecting a repeat mode of operation;
means for temporarily disengaging said latch means in a concluding portion of each period of driving of the gear means following said portion thereof corresponding to the automatic lead-in movement of the tone arm so that, with said mode selecting member in the position thereof for selecting the manual mode of operation, said tone arm can be manually lead-in from said rest position to a manually determined set-down position on the record;
and means responsive to each said period of driving of the gear means for effecting the step-wise movement of said mode selecting member in the direction toward said position thereof for the stop mode.

3. A phonograph record player according to claim 2; in which said mode selecting member has a plurality of positions thereof for selecting repeat modes of operation and which, considered in the direction opposed to said direction of step-wise movement, provide progressively increasing numbers of repeated play operations.

4. A phonograph record player according to claim 3; in which said mode selecting member has means thereon for preventing said step-wise movement thereof when said mode selecting member is disposed in the one of said plurality of positions for selecting repeat modes of operation which is furthest from said position for selecting the stop mode, so that said one position for selecting a repeat mode of operation corresponds to indefinitely repeated play operations.

5. A phonograph record player according to claim 4; further comprising detent means for releasably holding said mode selecting member in each of said positions thereof.

6. A phonograph record player according to claim 3; in which said means for effecting the step-wise movement of said mode selecting member includes ratchet teeth arranged along an edge of the latter in said direction of movement thereof, pawl means normally spaced from said edge of the mode selecting member to permit the manual movement of the latter to any one of said positions of the mode selecting member, and means responsive to said concluding portion of each period of operation of said gear means for imparting an operative stroke to said pawl means by which the latter acts against one of said ratchet teeth for effecting said stepwise movement.

7. A phonograph record player according to claim 6; in which said ratchet teeth are disposed along said mode selecting member so as to be out of the range of said operative stroke of the pawl means in the position of said mode selecting member for selecting the stop mode and also in the one of said plurality of positions for selecting repeat modes which is furthest from said position for selecting the stop mode so that, when said mode selecting member is in said one position, said step-wise movement is prevented and the play operation is repeated indefinitely.

8. A phonograph record player according to claim 7; in which said gear means includes a drive pinion rotatable by said drive means, and a rotatable control gear having peripheral teeth with a gap therein facing toward said pinion in a stop position of said control gear and a continuous cam having a lead-out portion followed by a lead-in portion; said trip means is mounted on said control gear and is operative on each actuation to angularly displace said control gear from said stop position for engaging said peripheral teeth with said pinion and thereby causing a revolution of said control gear corresponding to said period of operation; said tone arm assembly further includes an operating arm coupled with said tone arm; and said lever means includes a cam follower successively engaging said lead-in and lead-out portions of said cam during each revolution of said control gear for effecting corresponding lead-out and lead-in movements of said lever means, means on said lever means engageable during said lead-out movement of the latter with said operating arm for effecting said return movement of the tone arm, and resilient means on said lever means engageable with said operating arm during said lead-in movement of the lever means for urging said lead-in movement of the tone arm.

9. A phonograph record player according to claim 8; in which said latch means is engageable with said operating arm for preventing said lead-in movement of the tone arm, and said operating arm is engageable with said trip means for actuating the latter upon the positioning of said tone arm corresponding to said completion of a play operation.

10. A phonograph record player according to claim 8; in which said means for imparting an operative stroke to said pawl means includes a pivoted repeat feed lever carrying said pawl means and having a cam surface, and a projection on said control gear engageable with said cam surface for effecting an angular displacement of said repeat feed lever following the engagement of said cam follower with said lead-in portion of the cam on said control gear and by which said operative stroke is imparted to said pawl means.

11. A phonograph record player according to claim 10; in which said repeat feed lever further has a notch following said cam surface and receiving said projection on the control gear in said stop position of the latter, and spring means acting on said repeat feed lever in the direction to urge said cam surface and notch against said projection on the control gear, whereby to prevent inadvertent movement of said control gear from said stop position.

12. A phonograph record player according to claim 11; in which said means for temporarily disengaging said latch means includes a disengaging member on said repeat feed lever acting on said latch means for disengaging the latter in response to the reception of said projection in said notch of the repeat feed lever.

13. A phonograph record player according to claim 10; in which said means for causing operation of the drive means includes switch means having a normally open condition for halting the operation of said drive means, means acted upon by said mode selecting member for closing said switch means when said mode selecting member is in any one of said positions thereof for selecting the manual and repeat modes of operation, and means for closing said switch means during each revolution of said control gear.

14. A phonograph record player according to claim 13; in which said means for closing the switch means during each revolution of the control gear includes a switch actuating member on said repeat feed lever, a pivoted switch support lever carrying said switch means, spring means urging said switch support lever in the direction to engage said switch means with said switch actuating member for closing said switch means, and means on said switch support lever engageable by said projection on the control gear in said stop position of the latter for displacing said switch support lever in a direction to separate said switch means from said switch actuating member and thereby achieve said normally open condition of the switch means with said mode selecting member in the stop mode position thereof.

15. A phonograph record player according to claim 2; further comprising arm lifting means actuable by said lever means for raising said tone arm during said return movement and said lead-in movement, and in which said means for causing operation of the drive means includes switch means having a normally open condition for rendering said drive means inoperative, a control lever having a switch actuating portion engageable with said switch means for closing the latter and causing operation of said drive means, means acting on said control lever for disengaging said switch actuating portion from said switch means in response to the disposition of said mode selecting member in the stop mode position of the latter, and means acting on said control lever for engaging said switch actuating portion with said switch means upon movement of said mode selecting member away from said stop mode position; and further in which said control lever has cam means thereon acting on said arm lifting means to hold said tone arm in a raised position when said mode selecting member is in said stop mode position thereof.

* * * * *